Aug. 7, 1962  F. R. REID  3,048,314
DOUGH TURNING APPARATUS
Filed Sept. 16, 1960  2 Sheets-Sheet 2

INVENTOR.
FRANCIS R. REID
BY
*Moore, White & Burd*
ATTORNEYS 3,048,314
DOUGH TURNING APPARATUS
Francis R. Reid, Louisville, Ky., assignor to The Pillsbury Company, Minneapolis, Minn., a corporation of Delaware
Filed Sept. 16, 1960, Ser. No. 56,375
14 Claims. (Cl. 226—108)

This invention relates to material conveying apparatus particularly adapted to the transfer of sheet or web material from one conveying means to another conveying means angularly disposed with respect to the first. More particularly, the present invention relates to apparatus for transferring plastic material in web form, such as biscuit dough or the like, from one conveyor means to a second conveyor means disposed below the first and whose longitudinal axis is disposed at a right angle or an acute angle with respect to the longitudinal axis of the first conveyor means.

The conveying apparatus of the present invention is adapted to receive dough or similar sheeted plastic or flexible material from a first conveyor and deposit it on a second conveyor while simultaneously changing the direction of travel of the material and inverting it. The apparatus is characterized by a plurality of powered rolls of varying lengths cantilevered from a support. The rolls are driven in the same direction and are provided with rounded ends over which the plastic or flexible material may pass without stretching, bunching, or tearing.

The invention is illustrated by the drawings in which the same numerals refer to corresponding parts and in which.

Figure 1:
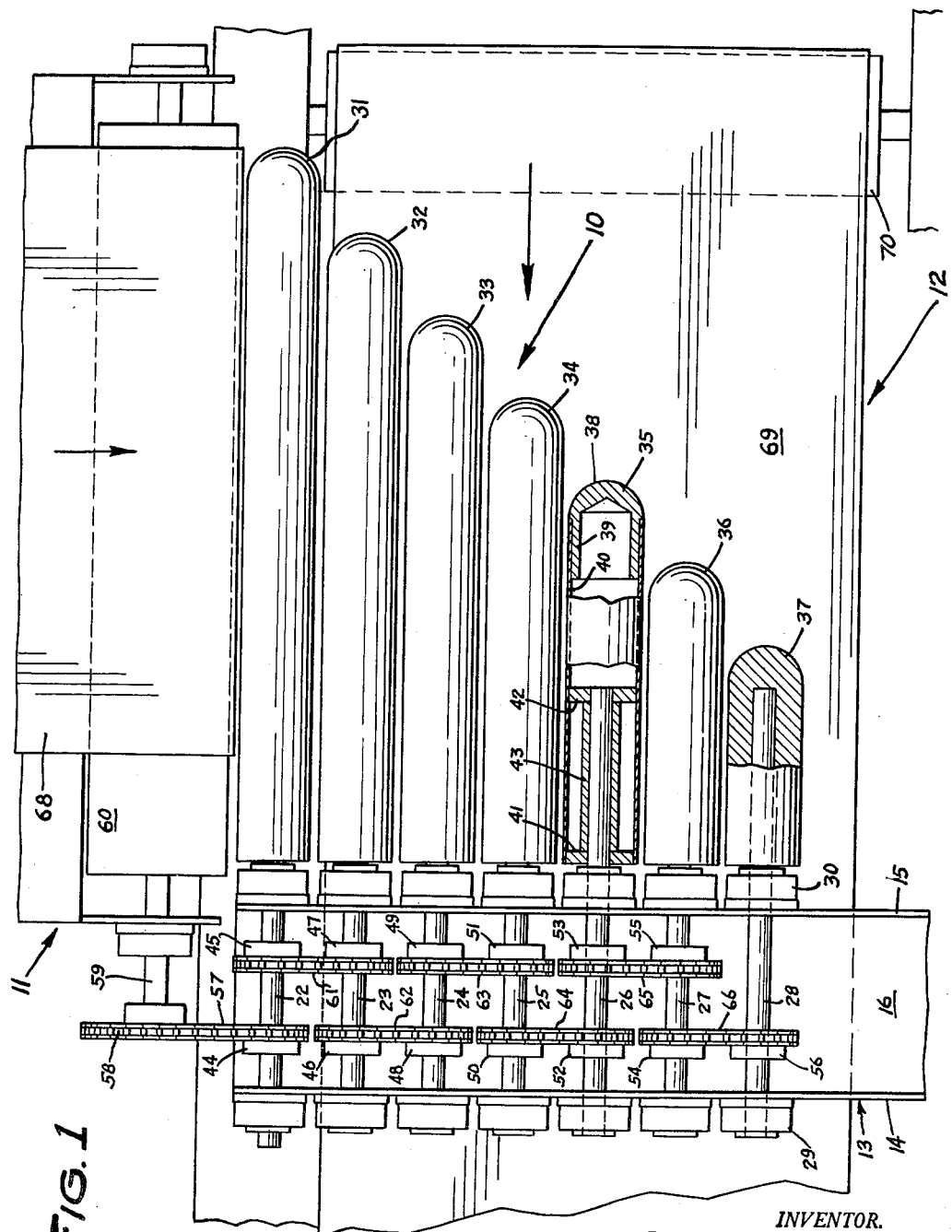
FIGURE 1 is a top plan view of the web turning apparatus according to the present invention, shown in use in conjunction with a pair of conveying means disposed at approximate right angles to each other; the apparatus is shown partly broken away and partly in section to reveal details of construction.
Figure 2:
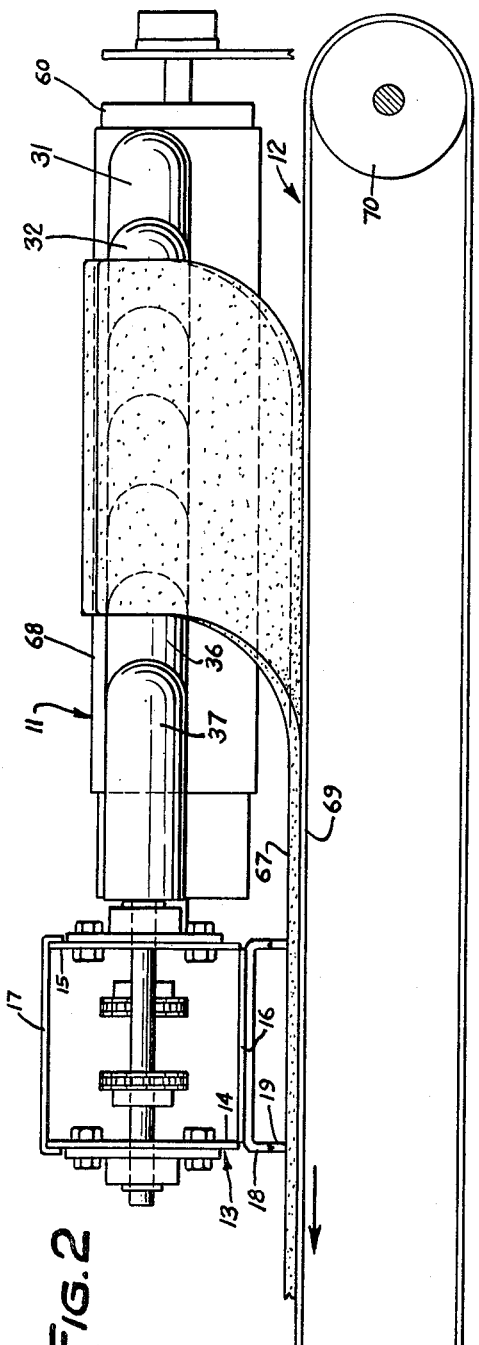
FIGURE 2 is a side elevation of the apparatus from the discharge side.
Figure 3:
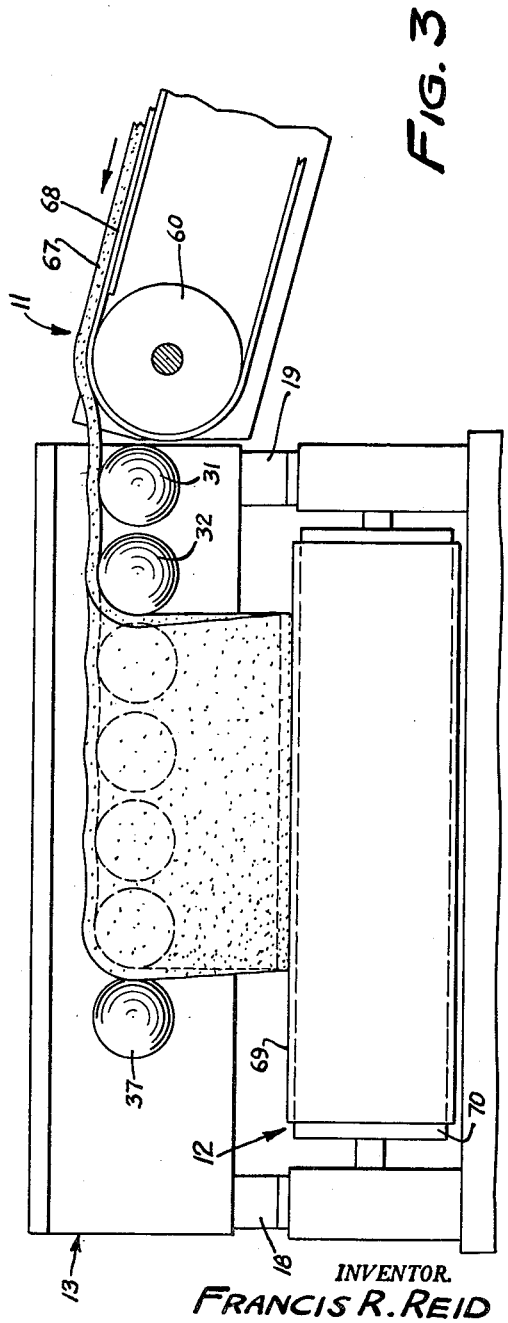
FIGURE 3 is an end elevation of the apparatus.

Referring now to the drawing, the transfer conveying means of the present invention is shown generally at 10. It is shown in association with a delivery conveyor indicated generally at 11 and a take-away conveyor indicated generally at 12. The apparatus will be described particularly with respect to its use in the conveying of sheeted biscuit dough, although it will be understood that its utility is not so limited but extends generally to any plastic or flexible material in sheet or web form.

The transfer and turning device includes a box-like supporting frame 13 comprised of a pair of spaced apart parallel elongated side walls 14 and 15, a bottom wall 16 and a removable top wall 17. The top 17 is removed in FIGURE 1 to show the drive mechanism. The box-like frame 13 is supported generally horizontally from a plurality of leg means 18 and 19 from the frame members forming part of the supporting structure of the take-away conveyor 12.

A plurality of similar shafts 22—28 is journalled for rotation in the frame of the turning device. Each of shafts 22—28 is journalled in a pair of identical bearings 29 and 30 secured to the opposite frame side walls 14 and 15, respectively. The shafts 22—28 are all parallel to one another and their axes of rotation lie in a common horizontal plane. Each of the shafts 22—28 extends a substantial distance beyond frame wall 15 and bearings 30. A plurality of rolls 31—37 is cantilevered out from the supporting frame 13, each roll supported by one of the shafts 22—28, respectively. Each of the rolls is generally cylindrical, each has the same diameter and each is provided with a hemispherical free end.

The rolls 31—37 are of uniformly varying lengths from the longest roll 31 to the shortest roll 37, with the result that a common straight line may be drawn which is tangential to the hemispherical end surface of each of the rolls. In the illustrated embodiment such a line is disposed at a 45° angle to the frame of the turning device and because the longitudinal axes of the delivery conveyor and of the take-away conveyor are perpendicular to one another, that line is also disposed at a 45° angle to the longitudinal axis of each of those conveyor means. It will be understood, of course, that where the longitudinal axes of the delivery conveyor and the take-away conveyor are disposed at some angle other than 90°, then the ends of the rolls 31—37 of the turning device are disposed at an angle other than 45°.

Rolls 31—37 are desirably formed from some smooth light weight material, such as aluminum or stainless steel or the like, which can be easily maintained clean and sanitary and to which dough or similar material does not adhere in its passage over the rolls. The rolls may be solid as in the case of the shortest rolls 36 and 37 and pressed with a tight fit on their respective shafts. The longer rolls, however, are desirably of hollow construction. One exemplary form of hollow roll construction is shown in FIGURE 1 where roll 35 is shown particularly broken away and partly in section. A hemispherical cap 38 having a tubular extension 39 is fitted into the end of a smooth hollow tube 40. The roll 35 is supported on shaft 26 by a spool like arrangement including a pair of annular disks 41 and 42 held spaced apart by a tube 43 and pressed on to the shaft and into hollow tube 40.

Each of shafts 22 through 27 carries a pair of drive sprocket pinions keyed to the shaft for rotation therewith. Thus, shaft 22 carries pinions 44 and 45. Shaft 23 carries pinions 46 and 47. Shaft 24 carries pinions 48 and 49. Pinions 50 and 51 are keyed to shaft 25. Pinions 52 and 53 are carried by shaft 26. Shaft 27 carries pinions 54 and 55. Shaft 28 carries a single pinion 56. In the illustrated embodiment drive sprocket 44 is driven by a chain drive 57 from a drive sprocket 58 carried by shaft 59, which in turn carries roller 60 of the delivery conveyor means 11. Thus, the transfer and turning device is driven from the delivery conveyor. Independent drive means may optionally be provided.

Each of the rolls 31—37 must be rotated at the same rate and in the same direction. To accomplish this according to the preferred embodiment of the invention, chain drives are alternated or staggered between adjacent drive pinions on the shafts 22—28. Shaft 22 is driven independently or directly from the delivery conveyor, as already described. Shaft 23 is driven from shaft 22 and in the same direction by means of chain drive 61 between pinions 45 and 47. Shaft 24 is rotated in the same direction by means of chain drive 62 between alternate pinions 46 and 48 on the adjacent shafts. Shaft 25 is driven by chain drive 63 between pinions 49 and 51. Shaft 26 is rotated by chain drive 64 between pinions 50 and 52. Shaft 27 is rotated by chain drive 65 between pinions 53 and 55 and shaft 28 is driven by chain drive 66 between pinions 54 and 56.

Rolls 31—37 are all of the same diameter and are driven in the same direction and at the same rate of rotation. The rate of rotation of the rolls 31—37 is related to the rates of travel of the delivery conveyor and take-away conveyor so that material being conveyed is moved at a generally uniform rate of travel.

In the illustrated embodiment, roller 60 of the delivery conveyor is of greater diameter than rolls 31—37. In order to maintain the same rate of travel of the sheet or web material it is necessary that the turning rolls 31—37 be rotated at a greater rate. It will be understood that where the turning rolls are of the same diameter as the roll of the delivery conveyor they will be rotated at the same rate of speed to advance the material at a uniform rate.

In the operation of the turning device a web of plastic dough 67 or similar material is carried on belt 68, which is supported on roll 60 of the delivery conveyor. Roll 60 is closely spaced from roll 31 of the turning device and is parallel to it. The upper surface of the belt 68 as it passes roll 60 is desirably aligned horizontally with the upper supporting surfaces of the rolls 31—37. The web of dough passes from belt 68 to roll 31 and thence on to the upper supporting surfaces of rolls 32, 33, etc. However, because the rolls become successively shorter as the dough advances, it is supported over less than its entire width as it passes to the shorter rolls. The unsupported portion of the web of dough drapes under the effect of gravity around the hemispherical ends of the rolls and is continued to be advanced by the rolls. This dough then contacts the belt 69 supported in part by roll 70 and comprising part of the take-away conveyor 12. Belt 69 moves in a direction generally perpendicular to the direction of movement of belt 68.

The dough which is carried around the ends of the cantilevered rollers is carried away by belt 69. That portion of the dough web which first leaves the cantilevered rolls has the shortest distance to travel in the direction of movement of the delivery conveyor but has the greatest distance to travel in the direction of the take-away conveyor, as compared to that corresponding portion of the dough on the opposite side of the web which is the last to pass beyond the support of the cantilevered rollers. Thus, the distances and the rates of travel of all portions of the dough web past the transfer apparatus are substantially the same. It will be noted that in the course of changing directions the dough has also been inverted.

It will be apparent that the number of shafts and rolls and the differences in lengths between adjacent rolls may be varied widely to accommodate the apparatus to the turning of webs of material where the angle of turn is less than 90° and where it is more than 90°, as well as the 90° turn illustrated and described. It is apparent that the number and spacing of rolls may be varied widely to accommodate different materials and different width webs. Although especially adapted to the turning of continuous webs it will be apparent that the apparatus is equally adapted to turning sheet materials in shorter lengths.

It is apparent that many modifications and variations of this invention as hereinbefore set forth may be made without departing from the spirit and scope thereof. The specific embodiments described are given by way of example only and the invention is limited only by the terms of the appended claims.

I claim:

1. Transfer apparatus for transferring flexible web material from one conveyor means to another while simultaneously changing the direction of travel of the web material, said apparatus comprising a frame, a plurality of parallel shafts journalled for rotation in said frame, one end of each of said shafts extending beyond one side of said frame, a plurality of cantilevered rolls each supported by one of said shafts for rotation therewith, said cantilevered rolls varying in length, and means for rotating said shafts and rolls in the same direction.

2. Apparatus according to claim 1 further characterized in that each of said cantilevered rolls varies in length uniformly from immediate adjacent rolls, whereby the ends of said rolls lie along a straight line angularly disposed relative to the axes of rotation of said rolls.

3. Apparatus according to claim 1 further characterized in that the axes of rotation of said cantilevered rolls lie in a common plane.

4. Apparatus according to claim 1 further characterized in that the free ends of said cantilevered rolls are hemispherical in contour.

5. Apparatus according to claim 1 further characterized in that said means for rotating the shafts and rolls in the same direction includes a sprocket pinion on each of said shafts, chain drive means interconnecting said pinions, and a drive sprocket on at least one of said shafts.

6. Apparatus according to claim 5 further characterized in that each of said shafts save the end shafts is provided with two sprocket pinions and said chain drive means interconnect alternate pinions on adjacent shafts.

7. Transfer apparatus for transferring flexible web material from one conveyor means to another whose path of travel is in a different direction angularly disposed with respect to the path of travel of the first conveyor, said apparatus comprising a frame, means for supporting said frame above the other of said conveyor means, a plurality of parallel shafts journalled for rotation in said frame, one end of each of said shafts extending beyond one side of said frame, a plurality of cantilevered rolls each supported by one of said shafts for rotation therewith, the axes of rotation of said shafts and said cantilevered rolls lying in a common horizontal plane, the free ends of said cantilevered rolls being hemispherical in contour, said cantilevered rolls varying in length uniformly from immediately adjacent rolls whereby the ends of said rolls lie along a straight line angularly disposed relative to the axes of rotation of said rolls, and means for rotating said shafts and rolls in the same direction.

8. Apparatus according to claim 7 further characterized in that said means for rotating the shafts and rolls in the same direction includes a sprocket pinion on each of said shafts, chain drive means interconnecting said pinions, and a drive sprocket on at least one of said shafts.

9. Apparatus according to claim 8 further characterized in that each of said shafts save the end shafts is provided with two sprocket pinions and said chain drive means interconnect alternate pinions on adjacent shafts.

10. Apparatus according to claim 7 adapted to change the direction of travel of a web of flexible material by 90°, said apparatus being further characterized in that the free ends of said cantilevered rolls lie along a line disposed at a 45° angle relative to the axes of rotation of said rolls.

11. In combination, a first delivery belt conveyor, a second take-away belt conveyor disposed to receive and carry flexible web material in a direction angularly disposed with respect to the path of travel of said first conveyor, and a transfer unit to transfer flexible web material from said first conveyor to said second conveyor; said transfer unit including a frame, means for supporting said frame above said second conveyor, a plurality of parallel shafts journalled for rotation in said frame, one end of each of said shafts extending beyond one side of said frame, a plurality of cantilevered rolls each supported by one of said shafts for rotation therewith, the axes of rotation of said shafts and said cantilevered rolls lying in a common horizontal plane, the free ends of said cantilevered rolls being hemispherical in contour, said cantilevered rolls varying in length uniformly from immediately adjacent rolls whereby the ends of said rolls lie along a straight line angularly disposed relative to the axes of rotation of said rolls and the paths of travel of said belt conveyors; the discharge end of said first belt conveyor being disposed parallel and adjacent to the longest of said cantilevered rolls; and means for rotating the shafts and cantilevered rolls of said transfer unit in the same direction.

12. The combination according to claim 11 further characterized in that said means for rotating the shafts and rolls of the transfer unit includes a sprocket pinion on each of said shafts, chain drive means interconnecting said pinions, a first drive sprocket on one of said shafts, a second drive sprocket on said first belt conveyor and operable therewith, and chain drive means interconnecting said drive sprockets.

13. The combination according to claim 12 further characterized in that each of said shafts save the end shafts is provided with two sprocket pinions, said chain drive means interconnect alternate pinions on adjacent shafts, and said first drive sprocket is on the shaft supporting the longest of said cantilevered rolls.

14. The combination according to claim 11 further characterized in that said first and second belt conveyors are disposed with their paths of travel perpendicular to one another and the free ends of said cantilevered rolls lie along a line disposed at a 45° angle relative to the axes of rotation of said rolls and the paths of travel of said conveyors.

References Cited in the file of this patent

UNITED STATES PATENTS 1,791,835    Nyborg et al. _____ Feb. 10, 1931

FOREIGN PATENTS 145,330    Australia _____ Feb. 21, 1952